May 12, 1959   R. H. SHOULBERG   2,885,712
AUTOMATIC CLEANING APPARATUS
Filed May 11, 1956
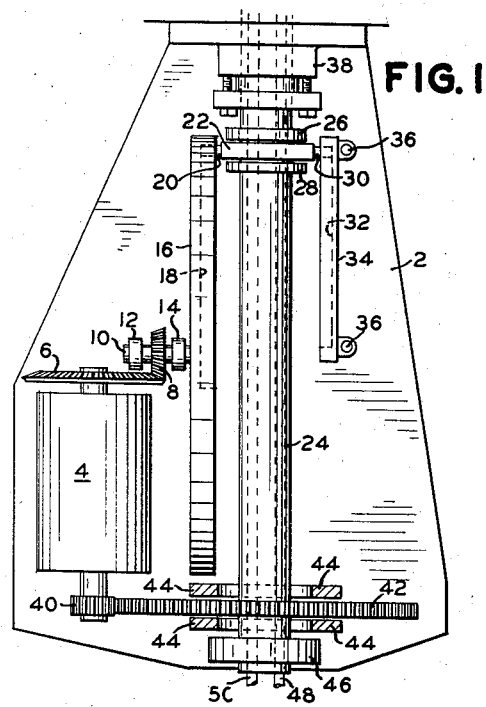
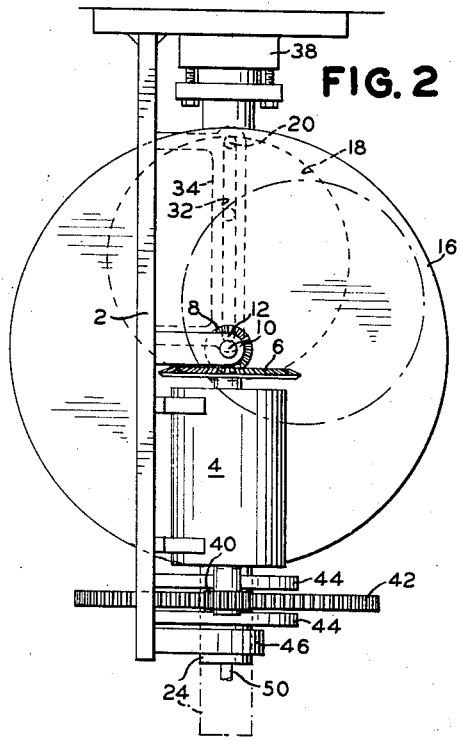
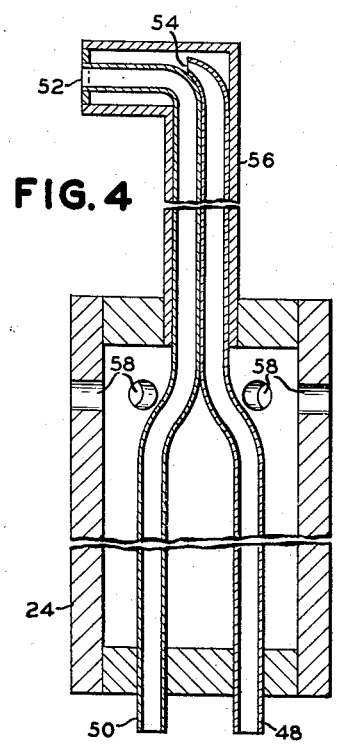
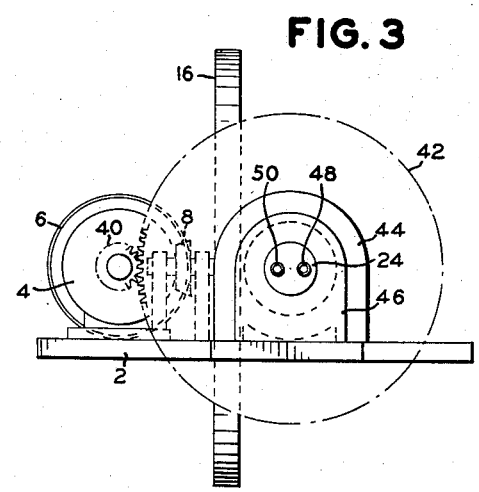
*INVENTOR.*
ROBERT H. SHOULBERG
BY G. H. Palmer
James E. Bryan
ATTORNEYS

United States Patent Office 2,885,712
Patented May 12, 1959

2,885,712
AUTOMATIC CLEANING APPARATUS

Robert H. Shoulberg, Mansfield, Mass., assignor to The M. W. Kellogg Company, Jersey City, N.J., a corporation of Delaware Application May 11, 1956, Serial No. 584,344

1 Claim. (Cl. 15—317)

This invention relates to an automatic cleaning apparatus adapted for use in burning carbon out of reactors, and more particularly relates to an automatic oxygen lance for removing carbon deposited in reactors used for the preparation of acetylene from saturated hydrocarbons.

Many classes of hydrocarbons may be pyrolyzed to produce compounds containing higher carbon to hydrogen ratios, and the compounds which may be so pyrolyzed include paraffins, olefins, aromatics, napthenes, and the like. Because of their greater availability, however, the lower boiling aliphatic hydrocarbons such as methane, ethane, ethylene, propane, propylene, and the like, find more frequent use in pyrolysis processes.

For example, in a process for the production of acetylene, a mixture of methane and oxygen in a ratio of between about 1.7 and about 2.3 moles of hydrocarbon per mole of oxygen is preheated to a temperature between about 600° F. and about 900° F. and passed into a reaction zone. Flame combustion within the reaction zone increases the temperature to between about 2000° F. and about 3000° F. whereupon pyrolysis of the hydrocarbon occurs. By maintaining a high linear velocity within the reaction zone, i.e., between about 60 and 400 feet per second, the residence time is maintained at an optimum level, i.e., between about 0.001 second and about 0.05 second. The product gases then pass into a quench tower where they are sprayed with water, which serves to rapidly reduce the temperature of the gases below the temperature at which reaction proceeds, after which the cooled gases are processed to separate the various gases from the mixture.

In this pyrolysis reaction, carbon formed in the process tends to deposit on the walls of the reaction chamber where it accumulates as a hard solid mass. Such a deposit once begun apparently increases gradually with time, and if not removed periodically may produce a substantial flow restriction. The distribution of carbon in the reaction zone is to a degree random in nature; however, the deposits are usually larger in certain locations than in others. For example, when the pyrolysis reaction is effected in a horizontal reactor the heaviest carbon deposition occurs on the bottom of the reactor, and when a flame stabilizing element is used in the reaction zone carbon tends to deposit at, around, and sometimes on this member. Usually, however, the greatest deposition occurs downstream from the refractory stabilizing element. When the flame is stabilized by other means, for example, by a pilot flame, carbon may be deposited throughout the reaction zone. Illustrations of such carbon deposition are shown in the drawings of copending application Serial No. 523,556, filed July 21, 1955.

One method for removing these carbon deposits which is used at the present time is to manually insert an oxygen lance into the end of the reactor and burn the carbon deposits out, but this operation has several important disadvantages in that it is difficult for the operator to observe the burning out operation as he is performing it, and the danger always exists of burning a hole through the refractory lining of the reactor by playing the oxygen flame on localized portions of the reactor interior for too long a period of time, although it is at the same time necessary to effect substantially complete removal of the carbon deposits in order to obtain high efficiency of reactor operation.

In accordance with the present invention an automatic cleaning system is provided for removing the carbon deposits from reactors and more particularly pyrolysis reactors, and in the system of the invention a water cooled oxygen lance is traveled up and down the walls of the reactor at a fixed distance of about one-eighth of an inch from the refractory lining while being simultaneously rotated so that the entire surface of the lining is cleaned.

The lance is driven by a "Selsyn" motor or slave which follows the movement of another "Selsyn" or master located in the plant control house. The master and the slave motors rotate at a low speed which will be dictated by the particular conditions of the cleaning operation. The slave, through a set of bevel gears, drives a plate cam whose follower is attached by a sleeve to the oxygen lance and, therefore, causes it to reciprocate. The slave through a set of spur gears also roates the lance at a much slower speed than the plate cam rotates, i.e., a factor of about 21 to 1 has been found to give good results. Thus, the lance moves in and out about 21 times when making one full revolution. The plate cam can be designed to cause the lance to dwell in parts of the reactor where experience has shown that the carbon deposits tend to be thickest, and the speed of the master "Selsyn" motor can be easily changed, thus adding flexibility to the system. In order to simplify the problem of sealing the water and oxygen feed to the lance, the "Selsyn" motor rotates the lance 180° in one direction then 360° in the opposite direction and finally 180° back to the original position. Rubber hoses attached to the lance twist and untwist following the rotation of the lance.

In actual operation the master "Selsyn" motor is connected to each slave in turn or several slaves simultaneously by means of a rotary switch in the control house and several minutes before a lance is to be driven into a reactor, an operator will turn on the oxygen and water feeds, and after the cleaning operation, which may take from a few minutes to several hours, he will make certain that the lance is retracted and the feeds shut off.

The gear which rotates the lance is free to move around the axis of the lance but is keyed thereto to prevent relative rotation, the gear being held in place by bearing stops secured to the support of the lance. The entire system can be lubricated by occasionally oiling the rubbing surfaces since there are no rapidly moving parts and no highly loaded members are used.

Referring to the accompanying drawings in which one embodiment of the present invention is shown Figure 1 is a plan view of the driving and support mechanism for an oxygen lance, Figure 2 is a side view in elevation of the device shown in Figure 1, Figure 3 is a bottom view in elevation of the device shown in Figure 1, and Figure 4 is a detailed view of one type of oxygen lance which may be secured to the support member of Figure 1.

Referring to Figure 1, the apparatus consists of a support member 2 which may be mounted in either a horizontal or vertical position, the support member having mounted thereon a "Selsyn" motor 4 having a bevel gear 6 mounted on one end of the motor shaft which drives a second bevel gear 8, the second bevel gear 8 being secured to the shaft 10. The shaft 10 is supported on the support base member 2 by the shaft hangers 12 and 14, respectively. In the embodiment shown the gear ratio of the gears 6 and 8 is 3 to 1.

Mounted on the right end of the shaft 10, as viewed in Figure 1, is a plate cam 16 having the cam track 18 cut therein as best seen in Figure 2, the cam track being engaged with the cam follower 20 which is formed on the collar 22, the latter being rotatably mounted on the shaft 24. Linear displacement of the collar 22 relative to the shaft 24 is prevented by the stop members 26 and 28 while rotation of the collar 22 is prevented by the follower 30 which travels in the track 32 in the guide member 34, the guide member being secured to the base or support member 2 by the bolts 36.

The upper end of the shaft 24, as viewed in Figure 1, is supported by the stuffing box 38 in which the shaft 24 is slidably mounted.

The "Selsyn" motor 4 also drives the spur gear 40 which meshes with the spur gear 42, the latter being keyed to the shaft 24 by a keyway, not shown. The spur gear 42 is thus slidably mounted on the shaft 24 and linear displacement of the gear 42 relative to the support member 2 is prevented by the bearing stops 44 which are secured to the base or support member 2. In the embodiment shown, the gear ratio of the spur gears 40 and 42 is 1 to 7. The lower end of the shaft 24, as viewed in Figure 1, is supported by the shaft hanger 46 which is secured to the base member 2.

The shaft 24 is a hollow tube being provided with two tubes therein, one for the introduction of oxygen gas and one for the introduction of cooling water. The oxygen gas is introduced through a tube 50 shown at the lower end of the shaft 24 in Figure 1, and the cooling water is introduced through the tube 48. The oxygen and cooling water pass upwardly through the tubes 48 and 50 in the shaft 24 and the oxygen is discharged through the end of the lance, shown in Figure 4 of the drawings, through the aperture 52. The cooling water is discharged through the aperture 54 inside of the cylindrical exterior casing or barrel 56 of the oxygen lance where it flows around the tip of the tube 50 as a cooling medium. From Figure 4 it will be seen that, while the tubes 48 and 50 are enclosed within the casing 56, there is considerable free space within the casing 56 so that the cooling water discharged from the tube 48 through the aperture 54 flows back down through the casing 56 where it can be discharged through the apertures 58, having hoses attached thereto if desired, or it may be discharged by any other convenient means. The apertures 58 may be formed in the supper end of the shaft 24 where it projects above the stuffing box 38 shown in Figure 1 or they may be formed in a separate cylindrical member which can be secured to the shaft 24 by any convenient means. In the latter case, removal of the lance from the shaft 24 is facilitated. The barrel or casing 56 of the lance may desirably be fabricated of a high chromium steel containing about 27 percent chromium, for example, and the tube 50 through which the oxygen is discharged is desirably fabricated from stainless steel containing 18 percent chromium and 8 percent nickel.

In operation, when the "Selsyn" motor is actuated, rotation of the bevel gears 6 and 8 causes a corresponding rotation in the plate cam 16 causing the cam follower and, therefore, the shaft 24 to reciprocate, which in turn moves the oxygen lance, connected to the upper end of the shaft 24 as viewed in Figure 1, to move in and out of a reactor, not shown, below which or at the end of which the support member 2 is mounted. The reactor may be in a horizontal or vertical position or may be mounted at an angle, if desired. Rotation of the spur gears 40 and 42 results in a corresponding rotation of the shaft 24 due to the keyed connection between the two. Thus, the simultaneous rotation and reciprocation of the shaft 24 causes the oxygen lance secured to the upper end thereof to travel up and down within the reactor while simultaneously rotating, so that the entire inner surface of the reactor is contacted with the oxygen flame. The plate cam 16 may be cut to any configuration desired in order to obtain a dwell in any desired position of the lance, and the speed of the driving motor may also be varied. The motor is of the reversible type so that the shaft 24 is rotated 180° in one direction, 360° in the opposite direction and 180° back to the initial position in order to facilitate the feed of oxygen and cooling water to the tubes 50 and 48, respectively.

It will be obvious to those skilled in the art that many modifications may be made within the scope of the present invention without departing from the spirit thereof and the invention includes all such modifications.

I claim:

A cleaning device comprising a first shaft, support means mounting said first shaft for rotation about and translation along a central axis, an oxygen lance having one end connected to said first shaft for rotation and translation movements therewith, said lance including jacket means, conduit means in said jacket means for passing oxygen to the other end of said lance, and conduit means in said jacket means for passing water to said jacket to cool substantially the full length of said oxygen conduit, a collar member mounted on said first shaft for rotation thereon, means for restraining said collar member against translation movements relative to said shaft, a cam follower carried by said collar member, a guide-way extending along said shaft, a member on said collar member adapted to engage said guide-way to maintain said cam follower in a predetermined path as said collar member moves with said first shaft in its translation movements, a second shaft support means mounting a second shaft for rotation, cam means mounted on said second shaft for rotation therewith, said cam means including a shaped follower track, said cam follower positioned to engage said track as said cam is rotated with said second shaft to move said first shaft through its translation movements, motor means, and gear means connecting said motor means to said first shaft and to said second shaft whereby upon actuation of said motor means said first shaft and said second shaft are rotated and simultaneously therewith said first shaft is translated along said central axis.

References Cited in the file of this patent

UNITED STATES PATENTS

| | | |
|---|---|---|
| 1,053,871 | Purdom | Feb. 18, 1913 |
| 1,183,417 | Zeitz | May 16, 1916 |
| 1,458,968 | Beezley | June 19, 1923 |
| 1,556,495 | Danks | Oct. 6, 1925 |
| 1,901,804 | Davis et al. | Mar. 14, 1933 |
| 1,987,972 | Rhein et al. | Jan. 15, 1935 |
| 2,066,014 | Pfleider | Dec. 29, 1936 |
| 2,519,542 | Carey et al. | Aug. 22, 1950 |
| 2,722,033 | Glinn et al. | Nov. 1, 1955 |

FOREIGN PATENTS

| | | |
|---|---|---|
| 576,077 | Great Britain | Mar. 18, 1946 |